US008489373B2

(12) United States Patent
Calmels

(10) Patent No.: US 8,489,373 B2
(45) Date of Patent: Jul. 16, 2013

(54) METHOD AND TOOL FOR SIMULATION OF THE AERODYNAMIC BEHAVIOUR OF AN AIRCRAFT IN FLIGHT CLOSE TO THE GROUND

(75) Inventor: Benoit Calmels, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 403 days.

(21) Appl. No.: 12/759,138

(22) Filed: Apr. 13, 2010

(65) Prior Publication Data

US 2010/0268517 A1    Oct. 21, 2010

(30) Foreign Application Priority Data

Apr. 21, 2009 (FR) ...................... 09 52578

(51) Int. Cl.
*G06F 17/10* (2006.01)
*G06F 7/60* (2006.01)
*G06F 17/50* (2006.01)
*G06G 7/48* (2006.01)

(52) U.S. Cl.
USPC ............................ 703/8; 703/1; 703/2; 703/6

(58) Field of Classification Search
USPC .................................................. 703/1, 2, 6, 8
See application file for complete search history.

(56) References Cited

U.S. PATENT DOCUMENTS

| | | | | |
|---|---|---|---|---|
| 7,926,340 | B2 * | 4/2011 | Calmels ........................... | 73/147 |
| 7,949,438 | B2 * | 5/2011 | Artini et al. ...................... | 701/3 |
| 2005/0197811 | A1 * | 9/2005 | Ariyur .............................. | 703/8 |
| 2010/0280802 | A1 | 11/2010 | Calmels | |

OTHER PUBLICATIONS

J. B. Vos, A. W. Rizzi, D. Darracq, E. H. Hirschel, Navier-Stokes Solvers in European Aircraft Industry, Progress in Aerospace Sciences, vol. 38, pp. 601-697 (2002).*
Search Report issued Nov. 19, 2009 in French Application No. 0952578 (with English Translation of Category of Cited Documents).
Dieter Schwamborn, et al., "The DLR TAU-Code: Recent Applications in Research and Industry", European Conference on Computational Fluid Dynamics, ECCOMAS CFD, XP-002556144, 2006, pp. 1-25.
Trade Barber, "Aerodynamic ground effect: a case study of the integration of CFD and experiments", International Journal of Vehicle Design, vol. 40, No. 4, XP-001539587, 2006, pp. 299-316.
Chih-Min Hsiun, et al., "Aerodynamic Characteristics of a Two-Dimentional Airfoil with Ground Effect", Journal of Aircraft, vol. 33, No. 2, XP 000582530, 1996, pp. 386-392.

(Continued)

*Primary Examiner* — Mary C Jacob
*Assistant Examiner* — Aniss Chad
(74) *Attorney, Agent, or Firm* — Oblon, Spivak, McClelland, Maier, & Neustadt, L.L.P.

(57) ABSTRACT

A method of computer simulation of an aerodynamic behavior of an aircraft in flight close to the ground includes generating a volume mesh of a three-dimensional geometric domain. The volume mesh is at least partly delimited by a three-dimensional geometric model of the aircraft and by a plane modelling the ground. The volume mesh defines a computational domain. The method also includes imposing a uniform boundary condition on the plane comprising a predetermined speed vector with a non-zero tangential component and a non-zero normal component, and solving a discrete numerical model of the Navier-Stokes equations by computer on the volume mesh with the uniform boundary condition imposed on the plane to obtain a numerical solution of a fluid flow inside said computational domain.

16 Claims, 5 Drawing Sheets

OTHER PUBLICATIONS

Yoshiatsu Oki, et al., "Improvement of Drag Prediction for Transonic Transport Aircraft Configuration Using Hybrid Unstructured Navier-Stokes Solver", The Japan Society of Mechanical Engineers International Journal, Series B, vol. 45, No. 4, XP-002556145, 2002, pp. 820-829.

Florian R. Menter, et al., "Zonal Two Equation k-ω Turbulence Models for Aerodynamic Flows", 24th Fluid Dynamics Conference, AIAA paper 93/2906, 1993, pp. 1-21.

M. Kato, et al., "The Modelling of Turbulent Flow Around Stationary and Vibrating Square Cylinders", Ninth Symposium on Turbulent Shear Flows, 1993, pp. 10-4-1-1-4-6.

Johan C. Kok, "Resolving the Dependence on Freestream Values for the k-ω Turbulence Model", AIAA Journal, vol. 38, No. 7, Jul. 2000, pp. 1292-1295.

* cited by examiner

METHOD AND TOOL FOR SIMULATION OF THE AERODYNAMIC BEHAVIOUR OF AN AIRCRAFT IN FLIGHT CLOSE TO THE GROUND

TECHNICAL FIELD

This invention relates to the general field of aerodynamics and more particularly to numerical simulation of the aerodynamic behaviour of an aircraft in flight close to the ground.

One application for it is in the aeronautical field in which the electrical flight control system of an aircraft and particularly the takeoff and landing aid system, must take account of aerodynamic effects induced by the ground effect and the slope effect.

STATE OF PRIOR ART

It is known that the aerodynamic behaviour of an aircraft in flight close to the ground is disturbed by an effect called the "ground effect".

This ground effect occurs particularly during aircraft takeoff and landing phases. When the aircraft is sufficiently close to the ground, its trajectory is deviated such that the pilot has the impression that the aircraft is moving on an air cushion.

The ground effect is the result mainly of a modification to the spatial development of wingtip vortices, due to the presence of the ground. The spatial development of these vortices may not be identical to the development of vortices that occurs in a flight at altitude. The spatial zone development of these vortices is then singularly reduced, which reduces their intensity.

This reduction in the intensity of wingtip vortices causes a reduction in the drag. Thus, for a particular angle of incidence, the lift to drag ratio is increased and de facto modifies the trajectory of the aircraft mentioned above.

In general, the ground effect specifically induces a change to the aerodynamic coefficients such as the lift, drag and pitching moment.

Note that the range of influence of the ground effect is limited essentially to a height above the ground of the order of one aircraft wingspan.

Obviously, this effect occurs equally during takeoff and during a flight parallel to and close to the ground.

For information, note that the flight dynamics of some aircraft makes direct use of the ground effect. These Ground Effect Vehicles or Wing In Ground Effect Vehicles include the Ekranoplane, a Russian aircraft built in the 1960s that flew a few meters above the Caspian sea.

At the present time aircraft, and particularly passenger or freight transport aircraft, are provided with electrical flight control systems equipped with computers which have the role of interpreting pilot orders in order to achieve the required trajectory.

Therefore, these computers must take account of the influence of the ground effect when the aircraft is close to the ground.

However, the influence of the ground effect on aerodynamic coefficients of an aircraft is particularly difficult to determine precisely.

Flight test campaigns are sometimes carried out. However, it is frequently difficult or even impossible to isolate the specific influence of the ground effect since it is strongly correlated to other aerodynamic phenomena such as local atmospheric disturbances (turbulence, gust) and flight manoeuvres necessary when the aircraft is close to the ground. The latter manoeuvres include deployment of bight-lift devices (slats and flaps) that in particular modify the global aerodynamics of the aircraft.

Wind tunnel tests may be carried out. This is done using the aircraft coordinate system. A small scale model aircraft is held fixed in a controlled airflow in a test stream. These wind tunnel tests eliminate uncertainties related to atmospheric conditions. However, other uncertainties appear related to the difficulty in adapting the non-slip condition on the ground to this coordinate system. Thus, in a wind tunnel, a boundary layer develops along the plane modelling the ground. This boundary layer does not exist in the fixed coordinate system of the ground and makes interpretation of the results difficult.

Furthermore, wind tunnel tests are normally carried out at zero slope, in other words the aircraft speed vector is parallel to the plane of the ground.

However, the slope of the aircraft speed vector relative to the ground is obviously not zero during takeoff and landing phases and induces a specific "slope" effect that is additional to the ground effect.

The influence of this slope effect relative to the ground effect then needs to be evaluated precisely.

PRESENTATION OF THE INVENTION

The main purpose of the invention is to present a method of making a computer simulation of the aerodynamic behaviour of an aircraft in flight and close to the ground, to identify the specific influence of the slope effect on said aerodynamic behaviour.

This invention aims to achieve this objective through a method of computer simulation of the aerodynamic behaviour of an aircraft in flight close to the ground.

According to the invention, the method comprises the following steps:

a volume mesh of a three-dimensional geometric domain is made, said mesh being at least partly delimited by a three-dimensional geometric model of said aircraft and by a plane modelling the ground, said mesh defining a computational domain;

a uniform boundary condition is imposed on said plane comprising a predetermined speed with a non-zero tangential component and a non-zero normal component; and a discrete numerical model of the Navier-Stokes equations is solved by computer on said mesh with said boundary condition imposed on said plane, so as to obtain a numerical solution of a fluid flow inside said computational domain.

Thus, the numerical solution of the fluid flow around the aircraft provides a means of directly defining the aerodynamic behaviour of the aircraft, starting from the characteristics of said flow.

The influence of the ground effect and the specific influence of the slope effect can be identified due to the proximity of the aircraft to the ground, and the boundary condition imposed on the ground plane.

Preferably, said numerical solution obtained includes speed and pressure fields defined inside said computational domain.

Said non-zero normal component of the predetermined speed of the boundary condition imposed on the plane modelling the ground may be strictly positive or strictly negative.

Advantageously, said mesh is also at least partly defined by an upstream plane face located upstream from said aircraft model along the longitudinal axis of the aircraft and perpendicular to said plane. In this case, a boundary condition is imposed on said upstream face before said computer solving step, comprising an upstream speed with:
- a fixed component identical in intensity and orientation to said predetermined speed imposed on said plane, and
- an additional component output from a fluid disturbance surrounding the aircraft, induced by said aircraft;

such that during said computer solving step, said discrete numerical model is solved, also including said boundary condition imposed on said upstream face.

The surrounding fluid disturbance may be any type of pressure wave such as a sound wave, a shock wave or more generally a discontinuity wave, or also an airflow induced by the presence or movement of the aircraft. In this case, the aircraft movement is taken in the fixed coordinate system of the ground. The disturbance may be directly from the aircraft or it may be reflected by the ground plane.

Preferably, the distance between said aircraft model and the plane modelling the ground is less than or equal to the wingspan of said aircraft.

Preferably, said tangential component of the predetermined speed is approximately parallel to the longitudinal axis of said aircraft model.

Advantageously, said method comprises a subsequent step to display the numerical solution obtained.

The invention also relates to a method for estimating aerodynamic coefficients of an aircraft in flight close to the ground, comprising the following steps:
- use of the computer simulation method for different flight parameters, according to any one of the previous characteristics;
- said flight parameters being chosen among an assembly composed of said predetermined speed imposed on said plane, the ratio between a distance of the aircraft from the ground and the wingspan of said aircraft, the angle of incidence formed by said predetermined speed with the longitudinal axis of the aircraft, and the slope formed by said predetermined speed with said plane;
- estimate of aerodynamic coefficients of said aircraft for each flight parameter, using said numerical solution obtained.

The invention also relates to a simulation tool for an aircraft in flight close to the ground comprising:
- software means for producing a volume mesh of a three-dimensional geometric domain, said mesh being at least partly delimited by a three-dimensional model of said aircraft and by a plane modelling the ground, said mesh defining a computational domain;
- means of inputting a uniform boundary condition imposed on said plane, comprising a predetermined speed with a non-zero tangential component and a non-zero normal component;
- software means of solving a discrete numerical model of the Navier-Stokes equations on said mesh with said boundary condition on said plane, so as to obtain the numerical solution of a fluid flow inside said computational domain;
- means of storing said numerical solution obtained.

Said simulation tool may also comprise means of displaying said numerical solution obtained.

Other advantages and characteristics of the invention will become clear after reading the non-limitative detailed description given below.

BRIEF DESCRIPTION OF THE DRAWINGS

We will now give a description of embodiments of the invention with reference to the appended drawings as non-limitative examples, among which.

DETAILED PRESENTATION OF ONE PREFERRED EMBODIMENT

Figure 1:
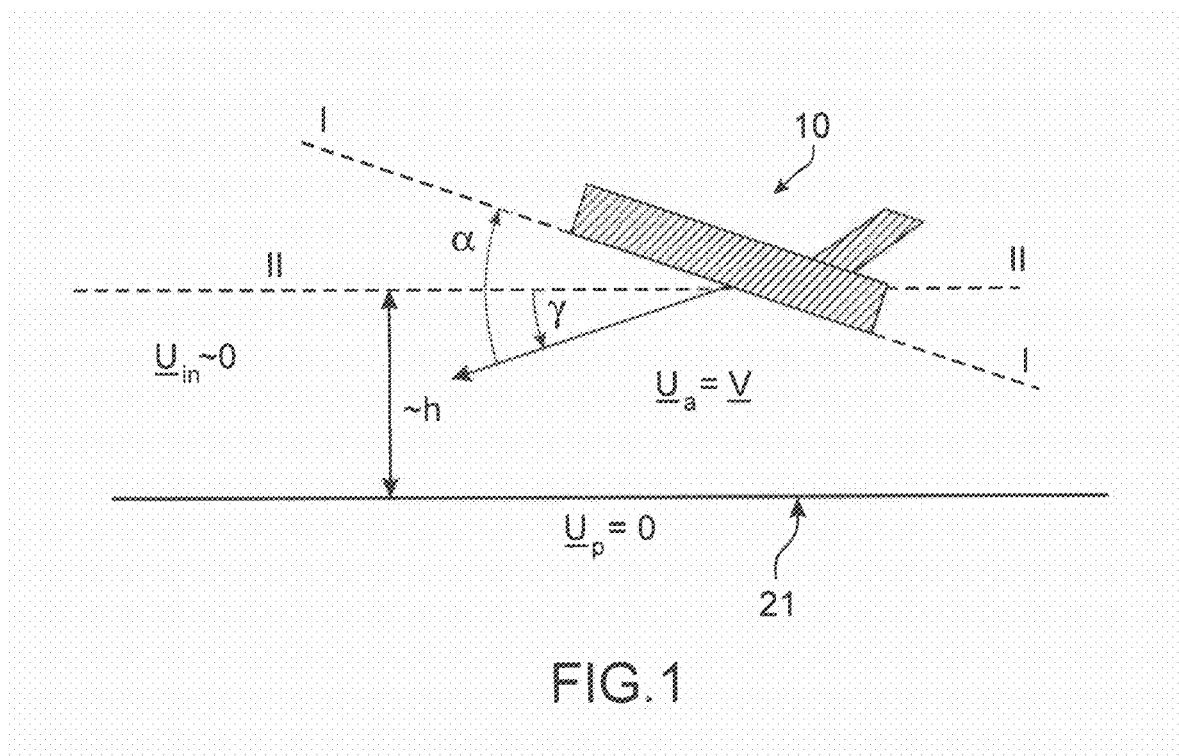
FIG. 1 is a diagrammatic longitudinal sectional view of an aircraft in flight close to the ground in the landing phase.

FIG. 1 shows a diagrammatic longitudinal sectional view of an aircraft 10 in flight close to the ground 21 in the fixed coordinate system of the ground.

The aircraft 10 is in the landing phase. It is moving at a speed V towards the ground represented by the lower plane 21, in an environment of air at rest. The speed V is a speed characteristic of the aircraft movement, and it may be the movement speed of the centre of gravity of the aircraft. The speed V may be of the order of a few tens of meters per second, for example 70 m/s.

The speed vector V forms an angle denoted $\alpha$, with the longitudinal axis I-I of the aircraft 10. This angle is called the angle of incidence in this description. The angle of incidence $\alpha$ may be between 0 and 20°. For information, this angle is also called the angle of attack (AoA).

The speed vector also forms an angle $\gamma$ or slope, with a horizontal plane II-II parallel to the ground 21. For example, the angle $\gamma$ may be between −5° and 10°.

For information, the angle formed between the longitudinal axis of the aircraft 10 and a horizontal plane parallel to the ground II-II is also called the aircraft attitude.

The aircraft height relative to the ground is denoted h and it may be defined as the distance between the centre of gravity of the aircraft 10 and the ground 21. Other parts of the aircraft may be chosen to define the height h such as the wingspan or the fuselage.

"Close to the ground" means that the distance from the aircraft to the ground is of the order of its wingspan, or less than its wingspan. The wingspan, denoted b, is defined as the distance between the aircraft wing tips.

Thus, the h/b ratio is preferably less than or equal to one and for example is about 0.1.

Under these conditions, the ground effect has a non-negligible aerodynamic influence.

Due to the non-zero value of the slope $\gamma$, there is also a slope effect additional to the ground effect that in particular can increase or reduce the influence of the ground effect.

The computer simulation method for simulating the aerodynamic behaviour of said aircraft in flight close to the ground will now be described according to the invention in the case of an aircraft in the landing phase, with reference to FIGS. 2 to 4.

Figure 2:
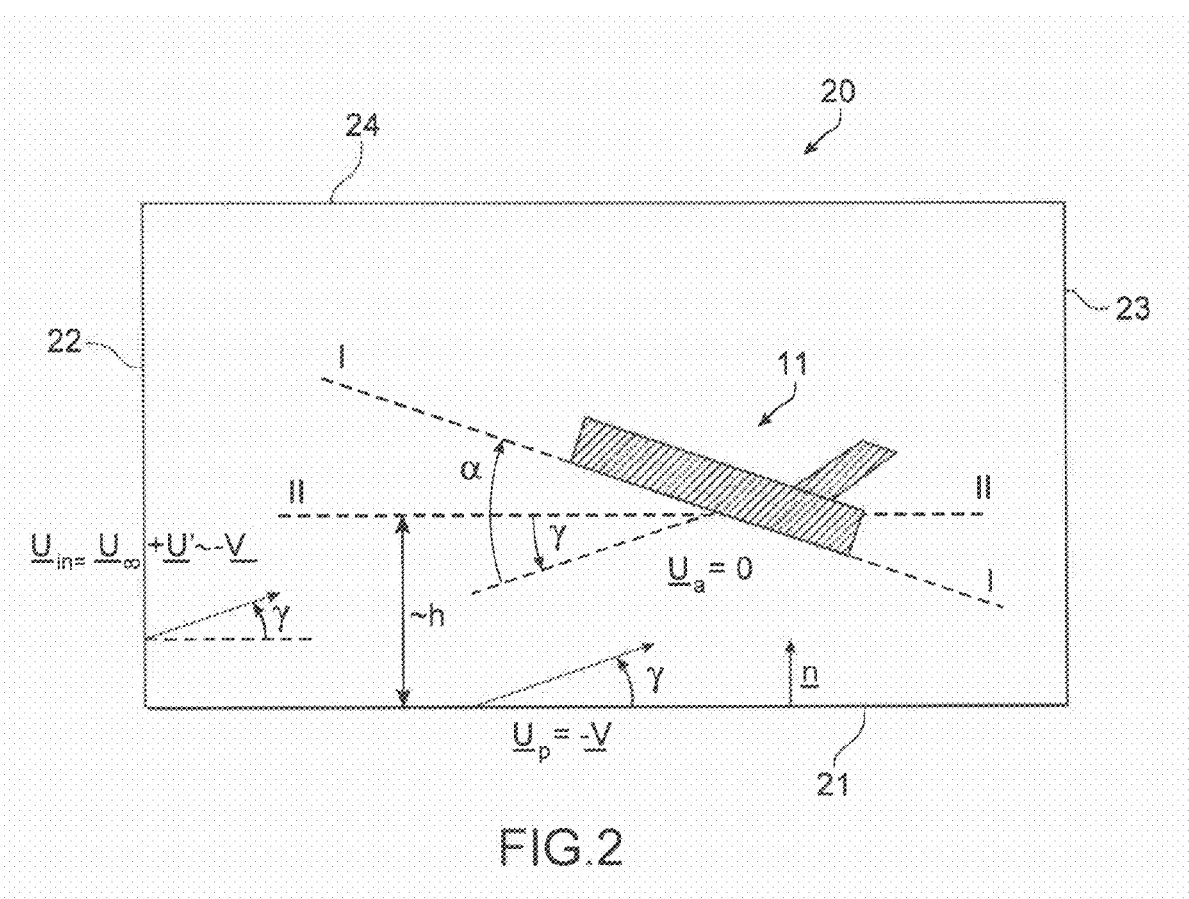
FIG. 2 is a diagrammatic longitudinal sectional view of the aircraft shown in FIG. 1 in the coordinate system of said aircraft, in a defined three-dimensional geometric domain.

FIG. 2 is a diagrammatic view of the aircraft corresponding to FIG. 1, shown in the coordinate system related to the aircraft.

Numeric references identical to those in FIG. 1 described above denote identical elements.

A three-dimensional geometric model of the aircraft is produced. Two example models are shown in FIGS. 3 and 4.

Figure 3:
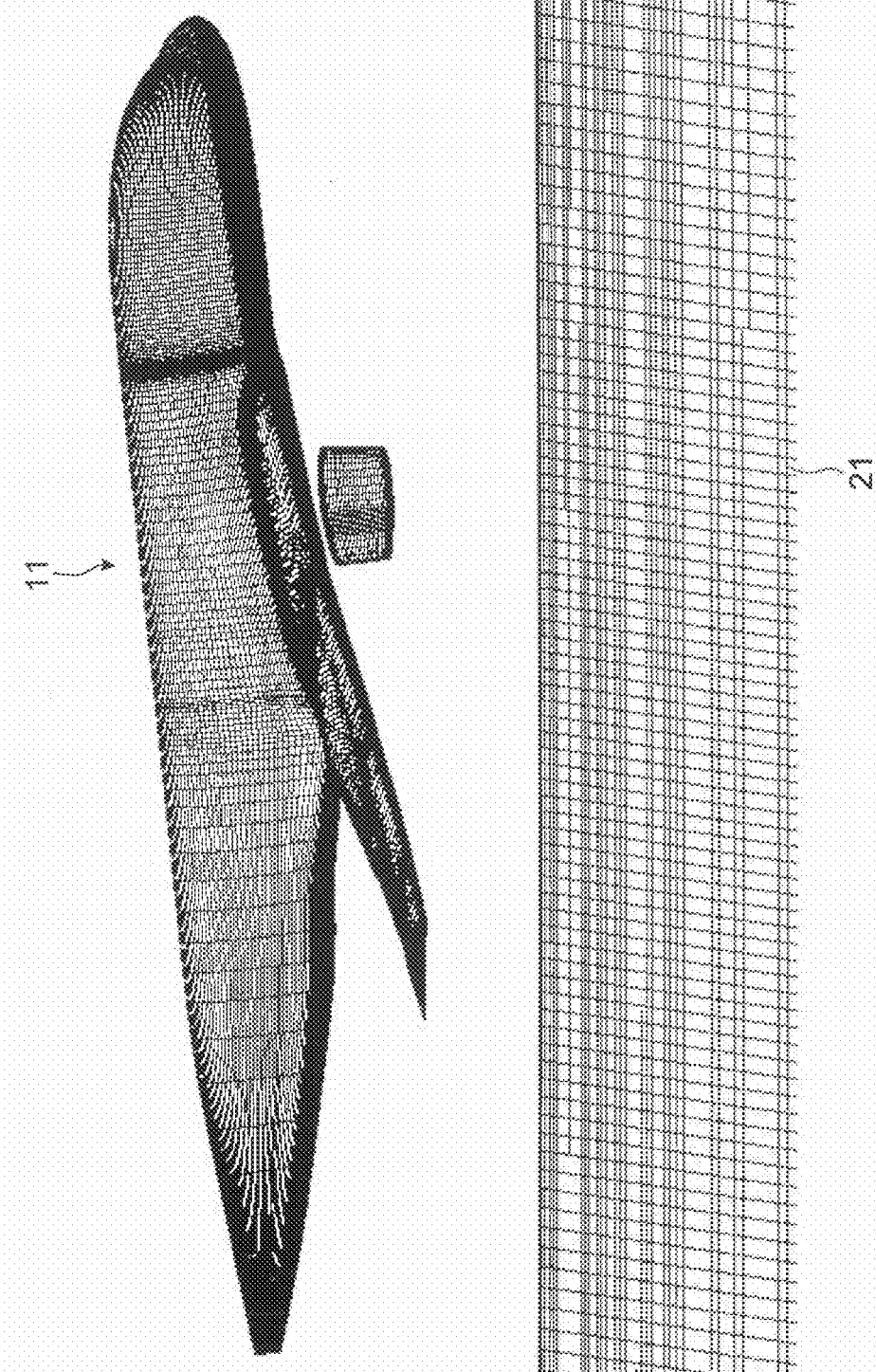
FIG. 3 is a side view of the mesh of a three-dimensional geometric model of the aircraft and a plane modelling the ground.

FIG. 3 is a side view of a simplified three-dimensional geometric model of an aircraft. The ground is modelled by a horizontal plane 21.

This simplified example model 11 of an aircraft does not include horizontal or vertical stabilisers, or landing gears. Each wing only supports one turbomachine not connected to it through an attachment pylon.

Figure 4:
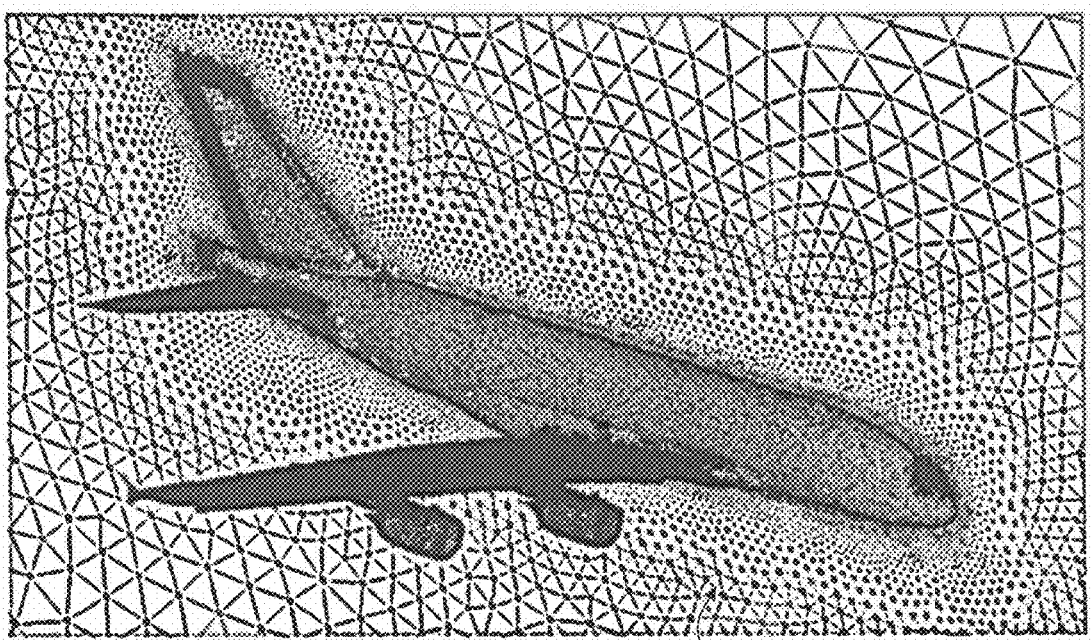
FIG. 4 is a perspective view of an example volume mesh of a part of the three-dimensional geometric domain surrounding a geometric model of the aircraft.

FIG. 4 shows a perspective view of an example of a complex three-dimensional geometric model 11 of a half-aircraft. The plane modelling the ground is not shown in this figure.

This example 11 of an aircraft model comprises in particular the horizontal and vertical stabilisers, two turbomachines supported by each wing through attachment pylons. It also comprises wing end tips which can have an important influence on the formation and development of wing tip vortices.

The choice of the complexity of the geometric aircraft model depends on a number of parameters.

The main advantage of a simplified aircraft model is the short time necessary for its production and simulation of its aerodynamic behaviour. Only the main elements of the aircraft are considered, such as the wingspan and the fuselage.

However, simplifications of the aircraft model induce differences from real phenomena. Local aerodynamic behaviours are not reproduced, for example such as flow disturbances due to the presence of turbomachines. Consequently, the aerodynamic behaviour of the aircraft can be represented unsatisfactorily or even incorrectly.

A more complex aircraft model takes better account of special geometric features of the aircraft, as is shown by the example in FIG. 4. This model aircraft is then close to the geometry of a real aircraft. However, this type of aircraft geometric model takes much longer to produce, and the simulation time is particularly long.

However, a complex aircraft model is still preferable because the information obtained about the aerodynamic behaviour of the aircraft is closer to reality and therefore can be used directly.

A mathematical model is chosen to reproduce the airflow surrounding the aircraft.

This model is the model of real compressible fluids, called the Navier-Stokes model. The fluid is assumed to be viscous, Newtonian and compressible and heat conducting.

This well-known physical model comprises a set of partial derivative equations called the continuity equation, dynamic equation and energy equation that are written as follows respectively:

$$\frac{d\rho}{dt} + \rho \frac{\partial U_j}{\partial x_j} = 0$$

$$\rho \frac{dU_i}{dt} = \rho F_i - \frac{\partial P}{\partial x_i} + \mu \left( \frac{\partial^2 U_i}{\partial x_j \partial x_j} + \frac{1}{3} \frac{\partial}{\partial x_i} \left( \frac{\partial U_l}{\partial x_l} \right) \right)$$

$$\rho C_v \frac{dT}{dt} = -P \frac{\partial U_j}{\partial x_j} + \Phi_v + \lambda \frac{\partial^2 T}{\partial x_j \partial x_j}$$

where $\rho(x)$ is the density of the fluid, $U(x)$ is the speed field, $P(x)$ is the pressure field, $T(x)$ is the temperature field, F is an external force dependent on the volume, such as gravity, $\mu$ is the dynamic viscosity, $C_v$ is the specific heat at constant volume, $\Phi_v$ is the viscosity dissipation rate and $\lambda$ is the thermal conductivity.

However, this physical Navier-Stokes model may be adapted to the description of turbulent flows.

The general Navier-Stokes equations given above may be reformulated in the known form of averaged equations called RANS for Reynolds Averaged Navier-Stokes, and then comprise a turbulence model.

Different known turbulence models may be used. Turbulence models with two equations such as the k-ε and k-ω models are usually used for modelling aerodynamic phenomena.

Among these models, the SST model as described in the Menter article entitled "Zonal Two Equation k-ω Turbulence Models for Aerodynamic Flows" published in 1993 in AIAA Paper 93-2906 may be used.

The so-called Kato-Launder modification can be used to correct the turbulent production term in the turbulent kinetic energy equation. This approach is described in the Kato and Launder article entitled "The Modelling of Turbulent Flow Around Stationary and Vibrating Square Cylindres" published in 1993 in Proc. 9th Symposium on Turbulent Shear Flows, Kyoto, pages 10.4.1 to 10.4.6.

It is also possible to take account of the so-called Kok TNT correction in the SST model with the Kato-Launder modification, that reduces the turbulent overproduction at the heart of vortices. This model is described in the Kok article entitled "Resolving the dependence of free stream values of the k-ω turbulence model" published in 2000 in AIAA Journal 38, 1292-1295.

Obviously, the invention is not limited to the use of these turbulence models. Other models can be used, for example such as the EARSM k-ω model developed by Hellsten.

A three-dimensional geometric domain 20 is defined corresponding to the space zone surrounding the aircraft 10 in which the airflow will be reproduced by simulation. This domain is also called the computational domain.

This geometric domain 20 is preferably rectangular parallelepiped in shape.

The lower face 21 of the geometric domain 20 is the plane used to model the ground. The upstream face 22 is located facing the nose of the aircraft 11 and the downstream face 23 is facing the upstream face. The upstream and downstream faces are connected by two lateral faces. Finally, the geometric domain 20 is delimited by an upper face 24 parallel to the ground plane.

The aircraft model 11 is placed in this geometric domain 20 so that it is sufficiently far from said faces, except for the ground plane.

For example, the aircraft model 11 is arranged at a distance from the ground plane equal to the order of 0.1 times the aircraft wingspan, namely h/b≦0.1.

The upstream face 22 may be located at a distance of the same order as the length of the aircraft from the forward end of the aircraft model 11. The downstream face 23 may be located at a distance of the order of twice the length of the aircraft from the aft end of the aircraft model. The lateral faces may be located at a distance from the wing tips of the order of the wingspan of the aircraft. Finally, the upper face 24 may be located at a distance of the same order as the wingspan or the length of the aircraft.

Note that the length of the aircraft may be defined as the distance between the forward and aft ends of the aircraft along the longitudinal axis I-I of the aircraft. The terms "forward" and "aft" refer to the direction of progress of the aircraft resulting from the thrust of the turbomachine, this direction being represented by the speed vector V shown in FIG. 1.

The physical Navier-Stokes model also comprises an initial condition and boundary conditions.

The initial condition may be a uniform speed field imposed throughout the geometric domain. The speed at the initial instant is equal to the opposite of the speed V defined above with reference to FIG. 1. Thus, we obtain $U_0=-V$ throughout the geometric domain.

The boundary conditions at the different boundaries (faces of the domain and surface of the aircraft model) of the geometric domain 20 are distributed into several categories.

A first category of boundary conditions concerns the condition imposed at the surface of the aircraft model.

The boundary condition imposed on the surface of the aircraft model is a conventional "wall" type condition.

A conventional "wall" type condition means that the speed at the surface considered is zero, and more particularly the tangential and normal components are zero, and any disturbance to the fluid surrounding the aircraft is reflected by said surface.

A second category of boundary conditions concerns the condition imposed on the plane 21 modelling the ground.

According to the invention, a uniform boundary condition is imposed on said plane comprising a predetermined speed $U_P$ with a non-zero tangential component $U_{P,t}$ and a non-zero normal component $U_{P,n}$.

The speed $U_P$ is imposed over the entire surface of the plane and preferably remains constant with time. The speed $U_P$ corresponds to the speed $-V$, in other words it is equal to the speed $-V$ in orientation and in intensity.

When an aircraft is landing as shown in FIG. 2, the normal speed $U_{P,n}$ is strictly positive. The takeoff case is described later with reference to FIG. 5.

A strictly normal positive speed means that the scalar product of the positive normal speed $U_{P,n}$ and a unit vector n normal to the face considered and by definition oriented towards the inside of the geometric domain 20 is strictly positive, therefore $U_{P,n}.n>0$.

Thus, the boundary condition at the plane is a modified "wall" type condition.

Modified "wall" type condition means that a non-zero predetermined speed is imposed, particularly a normal component to the surface assumed to be non-zero and that any disturbance to the fluid surrounding the aircraft is reflected by said plane.

As defined above, a disturbance to the surrounding fluid may be any type of pressure wave such as a sound wave, a shock wave or more generally a discontinuity wave, or also an airflow induced by the presence or movement of the aircraft. In this case, the aircraft movement is included in the fixed coordinate system of the ground. The airflow type disturbance may originate directly from the aircraft or it may be reflected by the ground plane.

A third category of boundary conditions applies to the other faces (lateral, upstream, downstream and upper) in the geometric domain.

For the upstream face 22, an upstream speed is imposed $U_{in}$ that has a fixed component $U_\infty$ identical in intensity and in orientation to said predetermined speed imposed on said plane $U_P$, and an additional component U' derived from a disturbance to the fluid surrounding the aircraft induced by said aircraft.

Thus, an airflow enters the geometric domain 20 with an average speed $U_\infty$.

Furthermore, any disturbance to the surrounding fluid induced by the aircraft may go outside the geometric domain 20 through the upstream face 22. The disturbance is then said to be outgoing.

The speed imposed on the upstream face $U_{in}$ may be non-uniform and depends on the outgoing disturbance. Thus the speed $U_\infty$ is preferably constant regardless of what point on the upstream face 22 is considered, while the speed U' is not necessarily constant in intensity and in orientation, depending on the point considered on the upstream face 22.

Note that said outgoing disturbance may be approximately zero or negligible compared with the airflow entering through the upstream face.

The speed $U_{in}$ is then approximately equal to the speed $U_\infty$.

The imposed boundary condition for the other faces of the geometric domain, in other words the downstream, lateral and upper faces, may be of the same type as for the upstream face.

The boundary condition at each of the downstream, lateral and upper faces includes an imposed speed comprising a fixed component $U_\infty$ identical in intensity and in orientation to said predetermined speed imposed on said plane $U_P$, and an additional component derived from a disturbance to the fluid surrounding the aircraft induced by said aircraft.

Any disturbance to the surrounding fluid induced by the aircraft can then go outside the geometric domain 20 through said faces.

As mentioned above, the additional component of the speed imposed on these faces is not necessarily constant in intensity and in orientation depending on the point on the face considered.

Alternately, the boundary condition imposed on each of the downstream, lateral and upper faces may be of the transparent or absorbent type.

Transparent or absorbent type boundary conditions means boundary conditions that cause no reflection of aerodynamic disturbances as defined above.

This type of boundary condition is known in the field of aerodynamic and aeroacoustic simulation.

Thus, the airflow entering through the upstream face may exit through these faces or through any of these faces.

Furthermore, surrounding fluid disturbances induced by the aircraft may also go outside the geometric domain.

Thus, as described above, the physical model includes all equations in the Navier-Stokes model, preferably adapted to the description of a turbulent flow, and an initial condition and boundary conditions imposed on the boundaries of the geometric domain (faces of the domain and surface of the aircraft model).

The geometric domain 20 is discretised during the creation of the three-dimensional mesh.

The boundaries of the mesh are coincident with the boundaries of the geometric domain.

The mesh is preferably of the type structured in blocks. The blocks may be overlapping so as to form a Chimera mesh.

The Chimera mesh is usually capable of producing meshes around complex surfaces of aircraft models, for example such as deflected surfaces, landing gear, pylons.

The mesh is created using software, for example the CATIA V5 software.

Other types of mesh may be used, for example such as a structured mesh for the entire geometric domain, a mesh structured by blocks without relative overlapping, or even an unstructured mesh (FIG. 4).

A discrete numerical model is then obtained by temporal and spatial discretisation of the physical Navier-Stokes model described above.

Different types of general numerical schemes may be used for spatial discretisation, such as finite volumes, finite elements or finite differences for spatial discretisation.

The finite volume technique is used in preference, particularly the second order with centred faces and the time discretisation is obtained by an implicit Runge-Kutta scheme. The time discretisation may also be obtained by various schemes known to those skilled in the art.

Thus, a discrete numerical Navier-Stokes model including an initial condition imposed on all meshes in the geometric domain at the start time, and boundary conditions imposed at the mesh boundaries is obtained.

The discrete numerical model described above is solved by computer, so that the airflow around the aircraft can be simulated.

Note that the distance h to the ground from the aircraft model is preferably kept constant during the simulation. Thus, the distance h does not vary during each time step in the simulation.

However, it would alternately be possible to vary the distance h in each time step as a function of the speed $U_P$. The mesh is then redefined during each time step.

A convergence criterion is used to stop the simulation when it has been satisfied.

The convergence criterion may be a physical magnitude such as a speed or pressure measured at a given point of the mesh. When this data is steady, it is assumed that the fluid flow in the geometric domain is established. The simulation can then be stopped.

The result obtained is a numerical solution of the fluid flow surrounding the aircraft.

This numerical solution includes speed, pressure and temperature fields at all points of the mesh.

It is stored in the memory of said computer, or in separate storage means.

The numerical solution may be displayed on a computer screen.

The aerodynamic behaviour of the aircraft is analyses by software means using the numerical solution obtained.

The aerodynamic coefficients of the aircraft, for example such as the drag and lift coefficients and the pitching moment, are then calculated from the speed and pressure fields obtained.

So-called ground effect coefficients can be calculated by subtracting or dividing the value of these coefficients obtained by the method according to the invention from the aerodynamic coefficients obtained in free air, in other words far from the ground.

The simulation may be repeated for different values of the h/b ratio, the speed V, and angles α and γ.

Thus, the influence of the ground effect on the aerodynamic behaviour of the aircraft and the specific influence of the slope effect are analysed.

This analysis may also be made for various aircraft geometric models. The influence of engines, landing gear, deflected flaps and any other particular element of the aircraft can be analysed.

The analysis results may be sorted in the form of databases. Each database indicates the aerodynamic coefficients of the aircraft with ground and slope effects for a wide range of the flight domain defined particularly by the h/b ratio and the speed of the aircraft, the angles α and γ, and the aircraft model used.

The method according to the invention can also be used with a predetermined speed $U_P$ imposed on the plane modelling the ground with a tangential component not parallel to the longitudinal axis I-I of said aircraft. The fixed component $U_\infty$ of the speed imposed on the upstream face and possibly on the downstream, lateral and upper faces remains identical in intensity and in orientation to said predetermined speed imposed on said plane $U_P$. Therefore, an airflow comes into the computational domain with a component approximately transverse to the longitudinal axis I-I of said aircraft.

It is also possible to use the method according to the invention with an aircraft with a non-zero lateral attitude. The aircraft is then inclined on the side and one wing is closer to the ground than the other.

Figure 5:
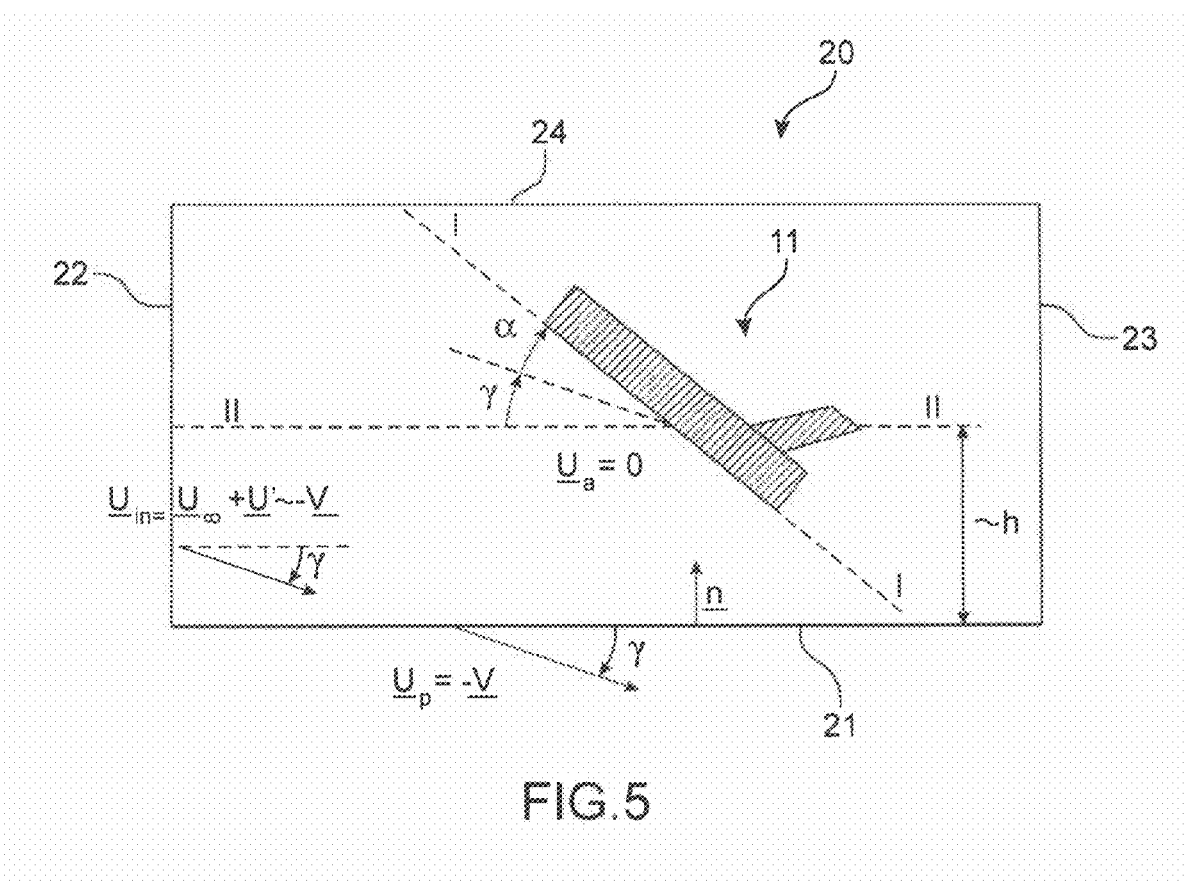
FIG. 5 is a diagrammatic longitudinal sectional view of the aircraft in flight close to the ground during the takeoff phase in the coordinate system of said aircraft.

The aerodynamic behaviour of the aircraft can be simulated in the case of an aircraft during the takeoff phase, as shown in FIG. 5.

Reference numbers identical to those in FIG. 2 described above denote identical elements.

Note that according to this flight configuration, the predetermined speed $U_P$ imposed on the ground plane has a strictly negative normal component $U_{P,n}$.

The simulation method is then practically the same as the method used for the aircraft during the landing phase and therefore will not be described again.

Obviously, those skilled in the art could make modifications to the invention that has just been described, solely as non-limitative examples.

Thus, the Navier-Stokes physical model used can be simplified. For example, the fluid surrounding the aircraft could be considered as being non-viscous. The Navier-Stokes model is then reduced to Euler equations for perfect fluids.

Furthermore, the description of turbulence using the Navier-Stokes model can be obtained as an alternative to the RANS model described above using LES (Large Eddy Simulation), RANS/LES hybrid, or DES (Detached Eddy Simulation) type models.

The invention claimed is:

1. A method of computer simulation of an aerodynamic behaviour of an aircraft in flight close to the ground, the method comprising:

generating a volume mesh of a three-dimensional geometric domain, said volume mesh being at least partly delimited by a three-dimensional geometric model of said aircraft and by a plane modelling the ground, said volume mesh defining a computational domain;

imposing a uniform boundary condition on said plane comprising a predetermined speed vector with a non-zero tangential component and a non-zero normal component; and solving a discrete numerical model of the Navier-Stokes equations by computer on said volume mesh with said uniform boundary condition imposed on said plane to obtain a numerical solution of a fluid flow inside said computational domain.

2. The method of computer simulation according to claim 1, wherein said numerical solution obtained includes speed and pressure fields defined inside said computational domain.

3. The method of computer simulation according to claim 1, wherein said non-zero normal component of the predetermined speed vector is strictly positive or strictly negative.

4. The method of computer simulation according to claim 1, further comprising:

defining said volume mesh at least partly by an upstream plane face located upstream from said three-dimensional geometric model of said aircraft along the longitudinal axis of the aircraft and perpendicular to said plane;

imposing another a boundary condition on said upstream face, said another boundary condition including an upstream speed vector having a fixed component vector identical in intensity and orientation to said predetermined speed vector imposed on said plane, and an additional component output from a fluid disturbance surrounding the aircraft and induced by said aircraft; and said solving is performed with said another boundary condition imposed on said upstream face.

5. The method of computer simulation according to claim 1, wherein a distance between said three-dimensional model of said aircraft and the plane modelling the ground is less than or equal to a wingspan of said aircraft.

6. The method of computer simulation according to claim 1, wherein said tangential component of the predetermined speed vector is approximately parallel to a longitudinal axis of said three-dimensional geometric model of said aircraft.

7. The method of computer simulation according to claim 1, further comprising:
displaying the numerical solution obtained.

8. A method for estimating aerodynamic coefficients of an aircraft in flight close to the ground, the method comprising:
simulating an aerodynamic behavior of the aircraft in flight close to the ground using different flight parameters, the simulating includes
generating a volume mesh of a three-dimensional geometric domain, said volume mesh being at least partly delimited by a three-dimensional geometric model of said aircraft and by a plane modelling the ground, said volume mesh defining a computational domain,
imposing a uniform boundary condition on said plane comprising a predetermined speed vector with a non-zero tangential component and a non-zero normal component, and
solving a discrete numerical model of the Navier-Stokes equations by computer on said volume mesh with said uniform boundary condition imposed on said plane to obtain a numerical solution of a fluid flow inside said computational domain;
said flight parameters being chosen among an assembly composed of said predetermined speed vector imposed on said plane, a ratio between a distance of the aircraft from the ground and a wingspan of said aircraft, an angle of incidence formed by said predetermined speed vector with a longitudinal axis of the aircraft, and a slope formed by said predetermined speed vector with said plane; and
estimating the aerodynamic coefficients of said aircraft for at least one of the flight parameters using said numerical solution obtained by the simulating step.

9. The method according to claim 8, wherein said numerical solution obtained includes speed and pressure fields defined inside said computational domain.

10. The method according to claim 8, wherein said non-zero normal component of the predetermined speed vector is strictly positive or strictly negative.

11. The method according to claim 8, further comprising:
defining said volume mesh at least partly by an upstream plane face located upstream from said three-dimensional geometric model of said aircraft along the longitudinal axis of the aircraft and perpendicular to said plane;
imposing another boundary condition on said upstream face, said another boundary condition including an upstream speed vector having
a fixed component vector identical in intensity and orientation to said predetermined speed vector imposed on said plane, and
an additional component output from a fluid disturbance surrounding the aircraft and induced by said aircraft; and
said solving is performed with said another boundary condition imposed on said upstream face.

12. The method according to claim 8, wherein a distance between said three-dimensional model of said aircraft and the plane modelling the ground is less than or equal to a wingspan of said aircraft.

13. The method according to claim 8, wherein said tangential component of the predetermined speed vector is approximately parallel to a longitudinal axis of said three-dimensional geometric model of said aircraft.

14. The method of computer simulation according to claim 8, further comprising:
displaying the numerical solution obtained.

15. A simulation tool for an aircraft in flight close to the ground, the tool comprising:
a processor configured to produce a volume mesh of a three-dimensional geometric domain, said volume mesh being at least partly delimited by a three-dimensional model of said aircraft and by a plane modelling the ground, said volume mesh defining a computational domain;
an inputting section that inputs a uniform boundary condition imposed on said plane comprising a predetermined speed vector with a non-zero tangential component and a non-zero normal component;
the processor further configured to solve a discrete numerical model of the Navier-Stokes equations on said volume mesh with said uniform boundary condition on said plane to obtain the numerical solution of a fluid flow inside said computational domain; and
a storage device that stores said numerical solution obtained.

16. The simulation tool according to claim 15, further comprising:
a display for displaying said numerical solution obtained.

* * * * *